United States Patent
Zhang et al.

(10) Patent No.: US 9,801,125 B2
(45) Date of Patent: Oct. 24, 2017

(54) DATA TRANSMISSION METHOD, MULTI-MEDIUM ACCESS POINT AND MULTI-MEDIUM CLIENT

(71) Applicant: ZTE CORPORATION, Shenzhen, Guangdong Province (CN)

(72) Inventors: Junjian Zhang, Shenzhen (CN); Lin Wang, Shenzhen (CN); Weiliang Zhang, Shenzhen (CN); Qiongwen Liang, Shenzhen (CN)

(73) Assignee: XI'AN ZHONGXING NEW SOFTWARE CO., LTD., Xi'An, Shaanxi (CN)

( * ) Notice: Subject to any disclaimer, the term of this patent is extended or adjusted under 35 U.S.C. 154(b) by 0 days.

(21) Appl. No.: 14/440,892

(22) PCT Filed: Aug. 29, 2013

(86) PCT No.: PCT/CN2013/082540
§ 371 (c)(1),
(2) Date: May 6, 2015

(87) PCT Pub. No.: WO2014/134908
PCT Pub. Date: Sep. 12, 2014

(65) Prior Publication Data
US 2015/0365886 A1    Dec. 17, 2015

(30) Foreign Application Priority Data
Mar. 7, 2013    (CN) .......................... 2013 1 0072420

(51) Int. Cl.
*H04W 48/02* (2009.01)
*H04W 48/08* (2009.01)
(Continued)

(52) U.S. Cl.
CPC ............ *H04W 48/18* (2013.01); *H04W 84/12* (2013.01)

(58) Field of Classification Search
None
See application file for complete search history.

(56) References Cited

U.S. PATENT DOCUMENTS

| 2003/0114153 A1 | 6/2003 | Shaver et al. | |
| 2004/0185845 A1* | 9/2004 | Abhishek | H04W 88/08 455/422.1 |

(Continued)

FOREIGN PATENT DOCUMENTS

| CN | 101227290 A | 7/2008 |
| CN | 101601223 A | 12/2009 |

(Continued)

OTHER PUBLICATIONS

XP055054554; IEEE P1905.1 TM/D02 Draft Standard for Convergent Digital Home Network for Heterogeneous Technologies, Dec. 14, 2011.

*Primary Examiner* — Duc Duong
(74) *Attorney, Agent, or Firm* — Ling Wu; Stephen Yang; Ling and Yang Intellectual Property

(57) ABSTRACT

A data transmission method, multi-medium access point and multi-medium client are disclosed. The method includes: a multi-medium access point (AP) acquiring a current wireless local area network (WLAN) operating mode of an opposite end multi-medium client (Client) from the opposite end multi-medium Client; and the multi-medium AP comparing an address of a target device to which a data packet to be sent is sent with an address of the opposite end multi-medium Client, if they are different, judging whether both a current WLAN operating mode of the multi-medium AP and the current WLAN operating mode of the opposite end multi-medium Client are three-address modes or not, and if yes, (Continued)

determining that the data packet to be sent is prohibited from being sent through a wireless fidelity (WiFi) interface of the multi-medium AP.

10 Claims, 3 Drawing Sheets

(51) Int. Cl.
*H04W 48/18* (2009.01)
*H04W 84/12* (2009.01)

(56) References Cited

U.S. PATENT DOCUMENTS

| | | | | |
|---|---|---|---|---|
| 2007/0248065 | A1* | 10/2007 | Banerjea | H04L 45/26 370/338 |
| 2008/0259845 | A1* | 10/2008 | Roh | H04W 88/08 370/328 |
| 2012/0051346 | A1* | 3/2012 | Herbert | H04L 29/12028 370/338 |
| 2013/0136117 | A1* | 5/2013 | Schrum, Jr. | H04W 88/06 370/338 |
| 2014/0064184 | A1* | 3/2014 | Cherian | H04L 61/103 370/328 |

FOREIGN PATENT DOCUMENTS

| | | |
|---|---|---|
| CN | 102055632 A | 5/2011 |
| CN | 202918289 U | 5/2013 |
| WO | 2013008114 A1 | 1/2013 |

* cited by examiner

DATA TRANSMISSION METHOD, MULTI-MEDIUM ACCESS POINT AND MULTI-MEDIUM CLIENT

TECHNICAL FIELD

The present document relates to the field of communication, and particularly, to a data transmission method, multi-medium access point and multi-medium client.

BACKGROUND

The Institute of Electrical and Electronics Engineers (IEEE) standardization organization is setting a new P1905.1 standard, as shown in FIG. 1, the standard provides an abstraction layer for multiple mediums of the home network, this abstraction layer provides a universal Service Access Point (SAP) of a control and data level for heterogeneous home network mediums such as IEEE P1901 (Power Line Communication (PLC)), IEEE 802.11 (Wireless Local Area Network (WLAN)), IEEE 802.3 (Ethernet) and MoCA 1.1, the abstraction layer can abstract detailed operation information with respect to every link being used, and aggregate data transmitted and received through different links, thereby implementing a seamless connection of various interconnection techniques in the home network. The advanced network management can also be performed through the software layer. For example, when a user equipment is connected to a link supporting different technologies, it is not required to enter different passwords any more, and it is only required to simply press a button. With the IEEE P1905.1, device discovery and configuration can be completed, a secure connection can be established, and other several advanced network management functions can be provided.

The IEEE P1905.1 provides lots of key functions and has many advantages, which can be used for implementing the next generation home network, and shown as follows.

1) Usability: as a consumer-oriented technology, it is vital that network configuration and use should be transparent to consumers. The IEEE P1905.1 provides a universal configuration method for adding devices to the network, establishing secure links and intelligently managing the network.

2) Reliable services: common network problems such as congestion or temporary linkage interrupt may lead to a deterioration of quality of service. By using a link selection mechanism, the device can adopt a replaceable link so as to reduce the times of service interruption, thereby ensuring a good user experience.

3) Increase of network capacity: a hybrid network can aggregate all bandwidths of different links, so as to maximize a throughput capacity.

4) Support for multi-media stream transmission: in applications such as interactive television, even one user can also watch multiple media streams at the same time, thus the new generation network must have an ability of supporting multiple high definition streaming medias simultaneously.

5) Congestion management: load balancing is supported and network congestion can be limited, which guarantees the network reliability and the content quality.

6) Interoperability: standard specifications of HomePlug, Wireless Fidelity (Wi-Fi), Ethernet and MoCA technologies are supported comprehensively, and backward compatibility with these technologies also can be implemented.

7) Security: the operators wish there will be a solid and reliable security mechanism, and meanwhile, in order to avoid excessive door-to-door services or after-sale telephone services, this type of security mechanism must be simple enough to enhance the usability. The device can be configured by pressing the button, which avoids complicated operations such as entering password.

8) Implementation of higher reliability by monitoring and diagnosis: identical diagnoses can be provided, and moreover, the operators also can monitor the network remotely and repair possible damages in advance, so as to prevent the user experience from being affected.

9) Self-service installation: the new generation home network must support simple installation, discovery and self-service configuration.

10) Universal interconnection: if the new generation network needs to implement thorough transparency, it must enable users to connect to the network in any room at home, and the users do not need to know which interface through which they are communicating. Moreover, when it is to transfer from one room (and interface) to another room (and interface), link handover must be seamless.

The IEEE P1905.1 provides an effective technique so as to practically solve a realistic question existing in today's home networks, only these problems are solved can the operators deploy the hybrid network securely. The interconnection techniques that have been deployed today are seamlessly connected by the IEEE P1905.1, which provides the last element required for the home interconnection.

A multi-medium access point AP and a multi-medium Client are one of device types of the heterogeneous home network, except the WLAN is supported, and other transmission modes such as PLC are also supported. The multi-medium Client generally refers to terminals such as a laptop and a mobile phone and consumer electronics devices that support WiFi.

The WLAN can use a four-address mode or a three-address mode.

The four-address mode uses a structure of four addresses (a data packet source address, a data packet destination address, a WiFi sending address and a WiFi receiving address). Wherein, descriptions will be made by taking the AP (access point) sending a data packet to the Client as an example, the data packet source address is an address of an uplink device of the AP, an address of a mount device of the AP or an address of the AP (when the AP generates the data packet); the data packet destination address is an address of a mount device of the Client (when the data packet is eventually sent to the mount device of the Client); the WiFi sending address is the address of the AP; and the WiFi receiving address is the address of the Client.

The three-address mode refers to, when the AP sends data to the Client, using three addresses (a data packet source address, a WiFi sending address and a WiFi receiving address) to perform sending; and when the Client sends data to the AP, using three addresses (a data packet destination address, a WiFi sending address and a WiFi receiving address) to perform sending.

As shown in FIG. 2 networking diagram, in a multi-medium home network networking environment, terminal devices (such as a mount PC machine and a set top box) are mounted to the multi-medium Client, the multi-medium AP and the multi-medium Client are connected via the WiFi and other wired/wireless ways. At present, in the multi-medium home network networking environment, a problem that normal communication cannot be performed between a mount device of the multi-medium Client and an uplink or mount device of the multi-medium AP occurs frequently.

SUMMARY

The technical problem required to be solved by the present document is to provide a data transmission method, multi-medium access point and multi-medium client, which can guarantee that normal communication is performed between mount devices of a multi-medium Client and uplink or mount devices of a multi-medium AP in a multi-medium home network networking environment.

In order to solve the above technical problem, a data transmission method according to the present document comprises:

a multi-medium access point (AP) acquiring a current wireless local area network (WLAN) operating mode of an opposite end multi-medium client (Client) from the opposite end multi-medium Client; and the multi-medium AP comparing an address of a target device to which a data packet to be sent is sent with an address of the opposite end multi-medium Client, if the address of the target device to which the data packet to be sent is sent and the address of the opposite end multi-medium Client are different, judging whether both a current WLAN operating mode of the multi-medium AP and the current WLAN operating mode of the opposite end multi-medium Client are three-address modes or not, and if yes, determining that the data packet to be sent is prohibited from being sent through a wireless fidelity (WiFi) interface of the multi-medium AP.

Preferably, the method further comprises:

after determining that the data packet to be sent is prohibited from being sent through the WiFi interface of the multi-medium AP, the multi-medium AP sending the data packet to be sent through interfaces except the WiFi interface on the multi-medium AP.

A multi-medium access point comprises: an abstraction layer entity, wherein:

the abstraction layer entity is configured to: acquire a current wireless local area network (WLAN) operating mode of an opposite end multi-medium client (Client) from the opposite end multi-medium Client, compare an address of a target device to which a data packet to be sent is sent with an address of the opposite end multi-medium Client, if the address of the target device to which the data packet to be sent is sent and the address of the opposite end multi-medium Client are different, judge whether both a current WLAN operating mode of the multi-medium access point (AP) and the current WLAN operating mode of the opposite end multi-medium Client are three-address modes or not, and if yes, determine that the data packet to be sent is prohibited from being sent through a wireless fidelity (WiFi) interface of the multi-medium AP.

Preferably, the abstraction layer entity is further configured to: after determining that the data packet to be sent is prohibited from being sent through the WiFi interface of the multi-medium AP, send the data packet to be sent through interfaces except the WiFi interface on the multi-medium AP.

Preferably, the multi-medium access point further comprises: a wireless local area network media access control (WLAN MAC) entity or an upper layer entity, wherein:

the abstraction layer entity is further configured to: query the current WLAN operating mode of the multi-medium AP from the WLAN MAC entity or the upper layer entity, and notify the opposite end multi-medium Client of the current WLAN operating mode of the multi-medium AP acquired by querying; or after the current WLAN operating mode of the multi-medium AP is changed, acquire the current WLAN operating mode of the multi-medium AP according to a notification of the WLAN MAC entity or the upper layer entity, and notify the opposite end multi-medium Client of the acquired current WLAN operating mode of the multi-medium AP.

A data transmission method comprises:

a multi-medium client (Client) acquiring a current wireless local area network (WLAN) operating mode of an opposite end multi-medium access point (AP) from the opposite end multi-medium AP; and the multi-medium Client comparing an address of a device in which a data packet to be sent is initially sent with an address of the multi-medium Client, if the address of the device in which the data packet to be sent is initially sent and the address of the multi-medium Client are different, judging whether both a current WLAN operating mode of the multi-medium Client and the current WLAN operating mode of the opposite end multi-medium AP are three-address modes or not, and if yes, determining that the data packet to be sent is prohibited from being sent through a wireless fidelity (WiFi) interface of the multi-medium Client.

Preferably, the method further comprises:

after determining that the data packet to be sent is prohibited from being sent through the WiFi interface of the multi-medium Client, the multi-medium Client sending the data packet to be sent through interfaces except the WiFi interface on the multi-medium Client.

A multi-medium client comprises: an abstraction layer entity, wherein:

the abstraction layer entity is configured to: acquire a current wireless local area network (WLAN) operating mode of an opposite end multi-medium access point (AP) from the opposite end multi-medium AP, compare an address of a device in which a data packet to be sent is initially sent with an address of the multi-medium client (Client), if the address of the device in which the data packet to be sent is initially sent and the address of the multi-medium Client are different, judge whether both a current WLAN operating mode of the multi-medium Client and the current WLAN operating mode of the opposite end multi-medium AP are three-address modes or not, and if yes, determine that the data packet to be sent is prohibited from being sent through a wireless fidelity (WiFi) interface of the multi-medium Client.

Preferably, the abstraction layer entity is further configured to: after determining that the data packet to be sent is prohibited from being sent through the WiFi interface of the multi-medium Client, send the data packet to be sent through interfaces except the WiFi interface on the multi-medium Client.

Preferably, the multi-medium client further comprises: a wireless local area network media access control (WLAN MAC) entity or an upper layer entity, wherein:

the abstraction layer entity is further configured to: query the current WLAN operating mode of the multi-medium Client from the WLAN MAC entity or the upper layer entity, and notify the opposite end multi-medium AP of the current WLAN operating mode of the multi-medium Client acquired by querying; or after the current WLAN operating mode of the multi-medium Client is changed, acquire the current WLAN operating mode of the multi-medium Client according to a notification of the WLAN MAC entity or the upper layer entity, and notify the opposite end multi-medium AP of the acquired current WLAN operating mode of the multi-medium Client.

In conclusion, in a multi-medium home network environment, if a data packet whose destination address is an address of a mount device of the multi-medium Client is forwarded on the multi-medium AP and both the multi-medium AP and the multi-medium Client are in the three-address mode, or, if a data packet whose source address is the address of the mount device of the multi-medium Client is forwarded on the multi-medium Client and both the multi-medium AP and multi-medium Client are in the three-address mode, the data packet is prohibited from being sent through a WiFi interface in the present document, but it can be sent through other interfaces such as PLC, thus normal data communication can be guaranteed between the mount device of the multi-medium Client and the multi-medium AP.

PREFERRED EMBODIMENTS OF THE DOCUMENT

Figure 1:
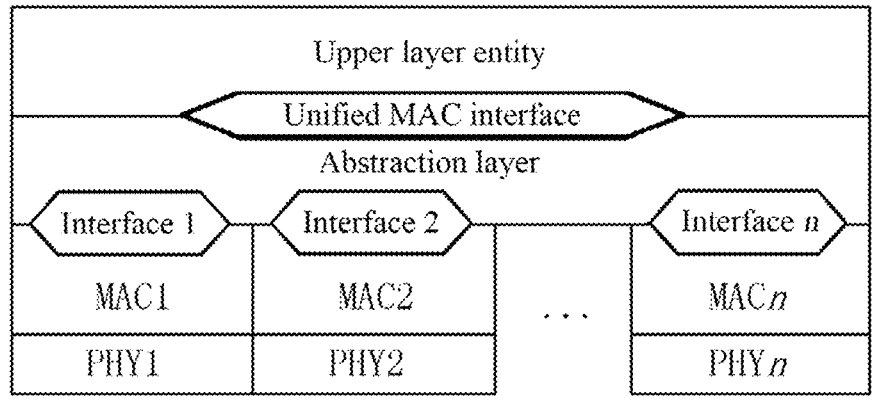
FIG. 1 is a model of an abstraction layer of a multi-medium home network in the related art.
Figure 2:
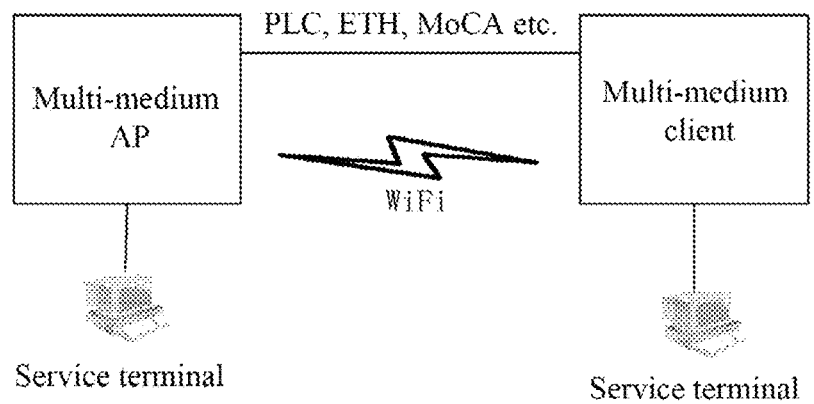
FIG. 2 is a networking diagram of a multi-medium home network in the related art.

As shown in FIG. 2, in a multi-medium home network environment, in consideration of that, when an AP sends a data packet to a Client and a three-address mode is adopted, the three-address mode lacks a data packet destination address when compared to a four-address mode; when the Client sends the data packet to the AP and the three-address mode is adopted, the three-address mode lacks a data packet source address when compared to the four-address mode, in these cases, if a data packet whose source address or destination address is an address of a mount device of the multi-medium Client is forwarded through a WiFi interface, when the multi-medium AP and the multi-medium Client are in the three-address mode, since the address of the mount device of the multi-medium Client cannot be carried when the data packet is forwarded through the WiFi interface, it causes that normal communication cannot be performed between the mount device of the multi-medium Client and the uplink or mount device of the multi-medium AP.

In the embodiment, when a destination address of a data packet to be sent on the multi-medium AP is the address of the mount device of the multi-medium Client, and the multi-medium AP and multi-medium Client are in the three-address mode, or, when a source address of the data packet to be sent on the multi-medium Client is the address of the mount device of the multi-medium Client, and the multi-medium AP and multi-medium Client are in the three-address mode, the data packet is prohibited from being sent through the WiFi interface in the embodiment, but it can be sent through interfaces except the WiFi interface on the multi-medium AP or multi-medium Client, such as PLC and so on, thus normal data communication with the mount device of the multi-medium Client can be guaranteed with the method of the embodiment.

In order to implement the method of the embodiment, it is required to obtain WLAN operating modes of the multi-medium AP and the multi-medium Client, which includes: WLAN operating mode querying and WLAN operating mode change notification. After the WLAN operating modes are obtained, the multi-medium AP and the multi-medium Client are required to notify the opposite side of its respective WLAN operating mode.

The obtaining of the WLAN operating mode of the multi-medium AP and the obtaining of the WLAN operating mode of the multi-medium Client will be described respectively below.

1. Obtaining of the WLAN Operating Mode of the Multi-Medium AP

The WLAN operating mode of the AP includes a three-address mode and a four-address mode, the current WLAN operating mode of the multi-medium AP can be obtained through active query by an abstraction layer, or after the WLAN operating mode is changed, a WLAN MAC layer or an upper layer notifies the abstraction layer actively.

(1) WLAN Operating Mode Querying of the Multi-Medium AP

Since the embodiment is based on that the WLAN operating mode is the three-address mode, it is required to query the current WLAN operating mode of the multi-medium AP. The way for querying can be that the abstraction layer of the multi-medium AP queries the WLAN MAC layer or the upper layer of the multi-medium AP, and the time for querying can be a time at the network discovery of the multi-medium home network, which is implemented by defining an interaction message or interaction parameters between the abstraction layer and the WLAN MAC layer or the upper layer.

(2) WLAN Operating Mode Change Notification of the Multi-Medium AP

A local or remote network management may modify the WLAN operating mode of the multi-medium AP, and after the WLAN operating mode is modified, the WLAN MAC layer or the upper layer of the multi-medium AP notifies the abstraction layer of the modified WLAN operating mode.

2. Obtaining of the WLAN Operating Mode of the Multi-Medium Client

The WLAN operating mode of the Client includes: a three-address mode and a four-address mode. The current WLAN operating mode of the multi-medium Client can be obtained through active query by an abstraction layer, or after the WLAN operating mode is changed, a WLAN MAC layer or an upper layer notifies the abstraction layer actively.

(1) WLAN Operating Mode Querying of the Multi-Medium Client

Since the embodiment is based on that the WLAN operating mode is the three-address mode, it is required to query the current WLAN operating mode of the multi-medium Client. The way for querying can be the abstraction layer of the multi-medium Client making a query to the WLAN MAC layer or the upper layer of the multi-medium Client, and the time for querying can be performed when network discovery is performed on the multi-medium home network, which is implemented by defining an interaction message or interaction parameters between the abstraction layer and the WLAN MAC layer or the upper layer.

(2) WLAN Operating Mode Change Notification

A local or remote network management may modify the WLAN operating mode of the multi-medium Client, and after the WLAN operating mode is modified, the WLAN MAC layer or the upper layer of the multi-medium Client notifies the abstraction layer of the modified WLAN operating mode.

3. the Abstraction Layer of the Multi-Medium AP and the Abstraction Layer of the Multi-Medium Client Will Notify the Opposite Side of its Respective Current WLAN Operating Mode Through an Interactive Message Between the Abstraction Layers.

After acquiring the current WLAN operating mode through querying or notification, the abstraction layer of the multi-medium AP and the abstraction layer of the multi-medium Client will inform the opposite side entity of the current WLAN operating mode parameters through a defined abstraction layer message.

4. a Processing Flow in which a Data Packet Direction is from the Multi-Medium AP to the Multi-Medium Client.

When a direction of the data packet to be sent is from the multi-medium AP to the multi-medium Client, the abstraction layer of the multi-medium AP will compare a destination MAC address in the data packet (i.e. an address of a target device to which the data packet is sent) with an MAC address of the opposite end multi-medium Client, if the destination MAC address in the data packet and the MAC address of the opposite end multi-medium Client are different, continues to judge whether both the current WLAN operating mode of the multi-medium AP and the current WLAN operating mode of the multi-medium Client are three-address modes or not, and if yes, prohibits the data packet from being sent through the WiFi interface. Data transmission can be performed through other interfaces (such as PLC and so on) except the WiFi interface on the multi-medium AP.

5. a Processing Flow in which a Data Packet Direction is from the Multi-Medium Client to the Multi-Medium AP.

When the data packet direction is from the multi-medium Client to the multi-medium AP, the abstraction layer of the multi-medium Client compares a source MAC address (i.e. an address of a device in which the data packet is initially sent) in the data packet with an MAC address of the multi-medium Client, if the source MAC address in the data packet and the MAC address of the multi-medium Client are different, continues to judge whether both the current WLAN operating mode of the multi-medium Client and the current WLAN operating mode of the multi-medium AP are three-address modes or not, and if yes, prohibits the data packet from being sent through the WiFi interface. The abstraction layer can perform data transmission through other interfaces (such as PLC and so on) except the WiFi interface on the multi-medium Client.

The present document will be described in detail in combination with the accompanying drawings and examples below. It should be noted that the examples in the present document and the characteristics in the examples can be combined with each other in the condition of no conflict.

Figures 3, 4:
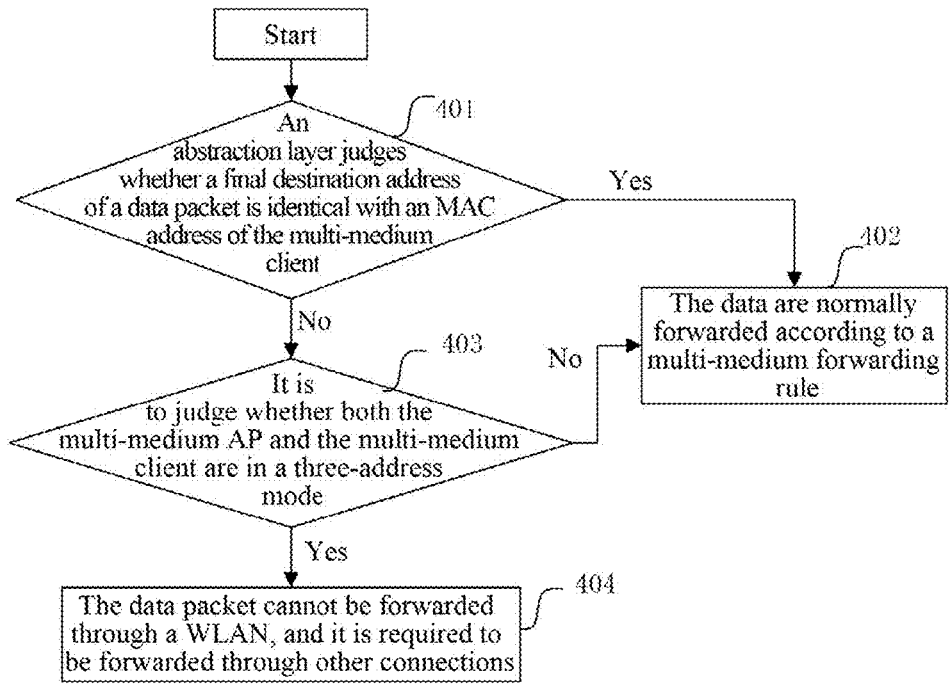
FIG. 3 is a flow diagram of a mechanism of querying and notifying a WLAN operating mode in the embodiment of the present document.
FIG. 4 is a flow diagram of processing when a data stream direction is from a multi-medium AP to a multi-medium Client in the embodiment of the present document.

As shown in FIG. 3, the flow of querying the WLAN operating mode in the embodiment includes:

1. WLAN operating mode querying of the multi-medium AP, including the following steps.

In step 1.1, in a network discovery process of the multi-medium home network, an abstraction layer of the multi-medium AP queries the current WLAN operating mode of the AP to a WLAN MAC layer or an upper layer of the multi-medium AP.

In step 1.2, the WLAN MAC layer or the upper layer of the multi-medium AP returns the current WLAN operating mode to the abstraction layer, the current WLAN operating mode includes a three-address mode and a four-address mode.

In step 1.3, after acquiring the current WLAN operating mode, the abstraction layer of the multi-medium AP notifies an abstraction layer of the multi-medium Client of the current WLAN operating mode of the multi-medium AP through a defined abstraction layer message.

The control message can be a newly defined abstraction layer control message, and the carried parameters include two parameters: an MAC address and a WLAN operating mode of the multi-medium AP.

2. WLAN operating mode querying of the multi-medium Client, including the following steps.

In step 1.1', in a network discovery process of the multi-medium home network, an abstraction layer of the multi-medium Client queries the current WLAN operating mode of the Client to a WLAN MAC layer or an upper layer of the multi-medium Client.

In step 1.2', the WLAN MAC layer or the upper layer of the multi-medium Client returns the current WLAN operating mode to the abstraction layer, the current WLAN operating mode includes a three-address mode and a four-address mode.

In step 1.3', after acquiring the current WLAN operating mode, the abstraction layer of the multi-medium Client notifies an abstraction layer of the multi-medium AP of the current WLAN operating mode of the multi-medium Client through a defined abstraction layer message.

The control message can be a newly defined abstraction layer control message, and the carried parameters include two parameters: a current MAC address and a current WLAN operating mode of the multi-medium Client.

3. WLAN operating mode change notification of the multi-medium AP, including the following steps.

In step 2.1, the WLAN MAC layer or the upper layer of the multi-medium AP discovers that the current WLAN operating mode is changed, and notifies the abstraction layer of the multi-medium AP of the changed WLAN operating mode.

In step 2.2, the abstraction layer of the multi-medium Client is notified of the current WLAN operating mode of the multi-medium AP through the abstraction layer message defined by the abstraction layer of the multi-medium AP.

The control message can be a newly defined abstraction layer control message, and the carried parameters include two parameters: a current MAC address and a current WLAN operating mode of the multi-medium AP.

4. WLAN operating mode change notification of the multi-medium Client, including the following steps.

In step 2.1', the WLAN MAC layer or the upper layer of the multi-medium Client discovers that the current WLAN operating mode is changed, and notifies the abstraction layer of the multi-medium Client of the changed WLAN operating mode.

In step 2.2', the abstraction layer of the multi-medium AP is notified of the current WLAN operating mode of the multi-medium Client through the abstraction layer message defined by the abstraction layer of the multi-medium Client.

The control message can be a newly defined abstraction layer control message, and the carried parameters include two parameters: a current MAC address and a current WLAN operating mode of the multi-medium Client.

As shown in FIG. 4, a method for sending a data packet when a data stream direction is from the multi-medium AP to the multi-medium Client in the embodiment includes the following steps.

In step 401, an abstraction layer of the multi-medium AP judges whether a destination address of a data packet to be sent (i.e. an address of a target device to which the data packet is sent) and a current MAC address of the opposite end multi-medium Client are identical, if yes, step 402 is executed; and if no, step 403 is executed.

In step 402, it continues the original forwarding flow of the abstraction layer, the flow ends.

In step 403, it is to judge whether the current WLAN operating mode of the multi-medium AP and the current WLAN operating mode of the opposite end multi-medium Client are in a three-address mode at the same time, if yes, step 404 is executed; and if no, step 402 is executed.

In step 404, the abstraction layer determines that the data packet to be sent is prohibited from being sent through a WiFi interface.

The abstraction layer sends the data packet to be sent through interfaces except the WiFi interface on the multi-medium AP.

Figure 5:
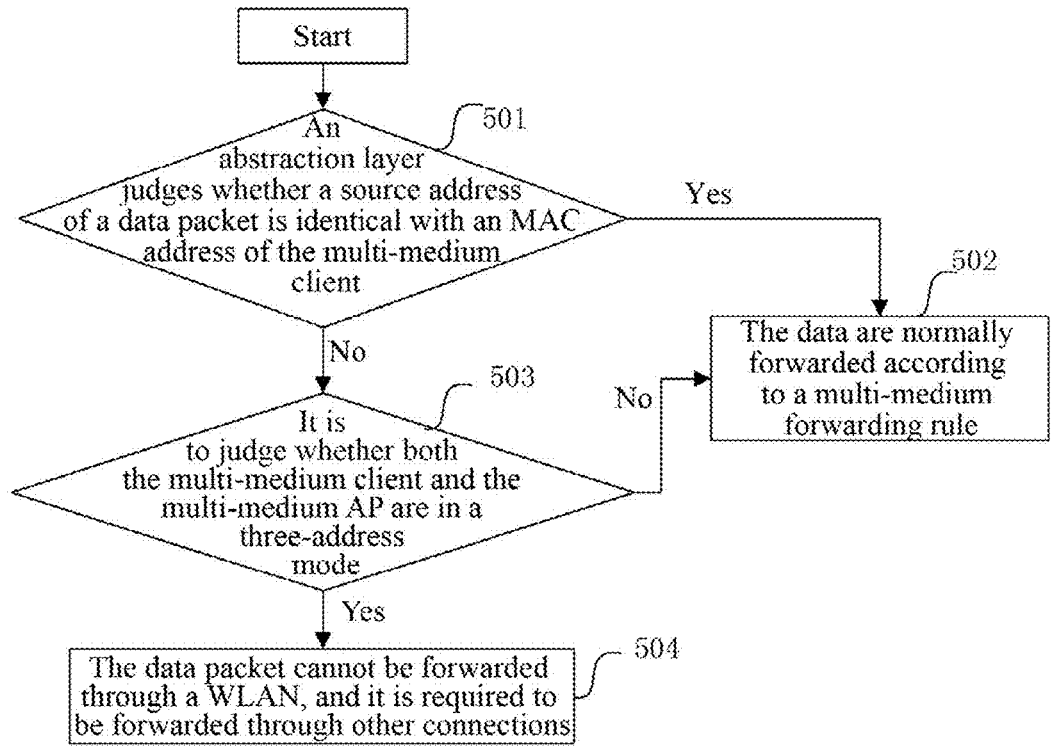
FIG. 5 is a flow diagram of processing when a data stream direction is from a multi-medium Client to a multi-medium AP in the embodiment of the present document.

As shown in FIG. 5, a method for sending a data packet when a data stream direction is from the multi-medium Client to the multi-medium AP in the embodiment includes the following steps.

In step 501, an abstraction layer of the multi-medium Client judges whether a source address of a data packet to be sent (i.e. an address of a device in which the data packet to be sent is initially sent) and a current MAC address of the multi-medium Client are identical, if yes, step 502 is executed; and if no, step 503 is executed.

In step 502, it continues the original forwarding flow of the abstraction layer, the flow ends.

In step 503, it is to judge whether the current WLAN operating mode of the multi-medium Client and the current WLAN operating mode of the opposite end multi-medium AP are in a three-address mode at the same time, if yes, step 504 is executed; and if no, step 502 is executed.

In step 504, the abstraction layer determines that the data packet to be sent is prohibited from being sent through a WiFi interface.

The abstraction layer sends the data packet to be sent through interfaces except the WiFi interface on the multi-medium Client.

Figure 6:
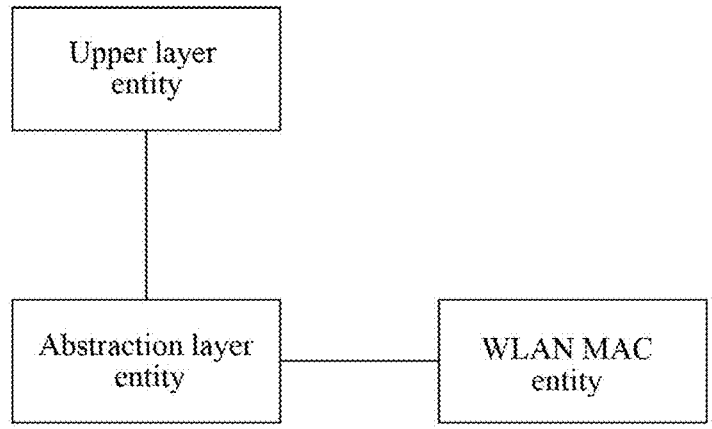
FIG. 6 is an architecture diagram of the multi-medium AP and the multi-medium Client according to the embodiment of the present document.

With reference to FIG. 6, the embodiment provides a multi-medium access point, which includes: an abstraction layer entity, wherein:

the abstraction layer entity is used to: acquire a current wireless local area network (WLAN) operating mode of an opposite end multi-medium client (Client) from the opposite end multi-medium Client, compare an address of a target device to which a data packet to be sent is sent with an address of the opposite end multi-medium Client, if the address of the target device to which the data packet to be sent is sent and the address of the opposite end multi-medium Client are different, judge whether both a current WLAN operating mode of the multi-medium access point (AP) and the current WLAN operating mode of the opposite end multi-medium Client are three-address modes or not, and if yes, determine that the data packet to be sent is prohibited from being sent through a wireless fidelity (WiFi) interface of the multi-medium AP.

The abstraction layer entity is also used to: after determining that the data packet to be sent is prohibited from being sent through the WiFi interface of the multi-medium AP, send the data packet to be sent through interfaces except the WiFi interface on the multi-medium AP.

The multi-medium access point also includes a wireless local area network media access control (WLAN MAC) entity or an upper layer entity, wherein:

the abstraction layer entity is also used to: query the current WLAN operating mode of the multi-medium AP from the WLAN MAC entity or the upper layer entity, and notify the opposite end multi-medium Client of the current WLAN operating mode of the multi-medium AP acquired by querying; or after the current WLAN operating mode of the multi-medium AP is changed, acquire the current WLAN operating mode of the multi-medium AP according to a notification of the WLAN MAC entity or the upper layer entity, and notify the opposite end multi-medium Client of the acquired current WLAN operating mode of the multi-medium AP.

With reference to FIG. 6 again, the embodiment also provides a multi-medium client, which includes: an abstraction layer entity, wherein:

the abstraction layer entity is used to: acquire a current wireless local area network (WLAN) operating mode of an opposite end multi-medium access point (AP) from the opposite end multi-medium AP, compare an address of a device in which a data packet to be sent is initially sent with an address of the multi-medium client (Client), if the address of the device in which the data packet to be sent is initially sent and the address of the multi-medium Client are different, judge whether both a current WLAN operating mode of the multi-medium Client and the current WLAN operating mode of the opposite end multi-medium AP are three-address modes or not, and if yes, determine that the data packet to be sent is prohibited from being sent through a wireless fidelity (WiFi) interface of the multi-medium Client.

The abstraction layer entity is also used to: after determining that the data packet to be sent is prohibited from being sent through the WiFi interface of the multi-medium Client, send the data packet to be sent through interfaces except the WiFi interface on the multi-medium Client.

The multi-medium client also includes a wireless local area network media access control (WLAN MAC) entity or an upper layer entity, wherein:

the abstraction layer entity is also used to: query the current WLAN operating mode of the multi-medium Client from the WLAN MAC entity or the upper layer entity, and notify the opposite end multi-medium AP of the current WLAN operating mode of the multi-medium Client acquired by querying; or after the current WLAN operating mode of the multi-medium Client is changed, acquire the current WLAN operating mode of the multi-medium Client according to a notification of the WLAN MAC entity or the upper layer entity, and notify the opposite end multi-medium AP of the acquired current WLAN operating mode of the multi-medium Client.

Apparently, the skilled in the art should understand that the modules or steps of the present document mentioned above can be implemented through a universal calculating device, and they can be concentrated on a single calculating device or distributed in a network consisting of multiple calculating devices. Alternatively, the modules or steps can be implemented through program codes which can be executed by the calculating device, thus, they can be stored in a storage device to be executed by the calculating device, and in some cases, the illustrated or described steps can be executed in a sequence different from here, or they can be made into multiple integrated circuit modules respectively or multiple modules or steps of them can be made into a single integrated circuit module to be implemented. Therefore, the present document is not limited to any combination of hardware and software in a specific form.

The above description is only the preferred examples of the present document, which is not used to limit the present document. The present document can have various modifications and changes for the skilled in the art. All the modifications, equivalent substitutions, and improvements, etc. made within the spirit and principle of the present document shall fall into the protection scope of the present document.

INDUSTRIAL APPLICABILITY

In a multi-medium home network environment, if a data packet whose destination address is an address of a mount device of the multi-medium Client is forwarded on the multi-medium AP and the multi-medium AP and multi-medium Client are in the three-address mode, or, if a data packet whose source address is the address of the mount device of the multi-medium Client is forwarded on the multi-medium Client and the multi-medium AP and multi-medium Client are in the three-address mode, the data packet is prohibited from being sent through a WiFi interface in the present document, but it can be sent through other interfaces such as PLC, thus normal data communication between the mount device of the multi-medium Client and the multi-medium AP can be guaranteed.

What is claimed is:

1. A data transmission method, comprising:
a multi-medium access point (AP) acquiring a current wireless local area network (WLAN) operating mode of an opposite end multi-medium client (Client) from the opposite end multi-medium Client; and
the multi-medium AP comparing an address of a target device to which a data packet to be sent is sent with an address of the opposite end multi-medium Client, if the address of the target device to which the data packet to be sent is sent and the address of the opposite end multi-medium Client are different, judging whether both a current WLAN operating mode of the multi-medium AP and the current WLAN operating mode of the opposite end multi-medium Client are three-address modes or not, and if yes, determining that the data packet to be sent is prohibited from being sent through a wireless fidelity (WiFi) interface of the multi-medium AP.

2. The method according to claim 1, further comprising:
after determining that the data packet to be sent is prohibited from being sent through the WiFi interface of the multi-medium AP, the multi-medium AP sending the data packet to be sent through interfaces except the WiFi interface on the multi-medium AP.

3. A multi-medium access point, comprising:
an abstraction layer entity,
a processor, and
a storage device storing program codes which, when executed by the processor, cause the processor to perform the following steps:
acquiring a current wireless local area network (WLAN) operating mode of an opposite end multi-medium client (Client) from the opposite end multi-medium Client, comparing an address of a target device to which a data packet to be sent is sent with an address of the opposite end multi-medium Client, if the address of the target device to which the data packet to be sent is sent and the address of the opposite end multi-medium Client are different, judging whether both a current WLAN operating mode of the multi-medium access point (AP) and the current WLAN operating mode of the opposite end multi-medium Client are three-address modes or not, and if yes, determining that the data packet to be sent is prohibited from being sent through a wireless fidelity (WiFi) interface of the multi-medium AP.

4. The multi-medium access point according to claim 3, wherein,
the program codes further cause the processor to perform the following step: after determining that the data packet to be sent is prohibited from being sent through the WiFi interface of the multi-medium AP, sending the data packet to be sent through interfaces except the WiFi interface on the multi-medium AP.

5. The multi-medium access point according to claim 4, further comprising: a wireless local area network media access control (WLAN MAC) entity or an upper layer entity, wherein the program codes further cause the processor to perform the following steps:
querying the current WLAN operating mode of the multi-medium AP from the WLAN MAC entity or the upper layer entity, and notify the opposite end multi-medium Client of the current WLAN operating mode of the multi-medium AP acquired by querying; or after the current WLAN operating mode of the multi-medium AP is changed, acquiring the current WLAN operating mode of the multi-medium AP according to a notification of the WLAN MAC entity or the upper layer entity, and notifying the opposite end multi-medium Client of the acquired current WLAN operating mode of the multi-medium AP.

6. A data transmission method, comprising:
a multi-medium client (Client) acquiring a current wireless local area network (WLAN) operating mode of an opposite end multi-medium access point (AP) from the opposite end multi-medium AP; and
the multi-medium Client comparing an address of a device in which a data packet to be sent is initially sent with an address of the multi-medium Client, if the address of the device in which the data packet to be sent is initially sent and the address of the multi-medium Client are different, judging whether both a current WLAN operating mode of the multi-medium Client and the current WLAN operating mode of the opposite end multi-medium AP are three-address modes or not, and if yes, determining that the data packet to be sent is prohibited from being sent through a wireless fidelity (WiFi) interface of the multi-medium Client.

7. The method according to claim 6, further comprising:
after determining that the data packet to be sent is prohibited from being sent through the WiFi interface of the multi-medium Client, the multi-medium Client sending the data packet to be sent through interfaces except the WiFi interface on the multi-medium Client.

8. A multi-medium client, comprising:
an abstraction layer entity,
a processor, and
a storage device storing program codes which, when executed by the processor, cause the processor to perform the following steps:
acquiring a current wireless local area network (WLAN) operating mode of an opposite end multi-medium access point (AP) from the opposite end multi-medium AP, comparing an address of a device in which a data packet to be sent is initially sent with an address of the multi-medium client (Client), if the address of the device in which the data packet to be sent is initially sent and the address of the multi-medium Client are different, judging whether both a current WLAN operating mode of the multi-medium Client and the current WLAN operating mode of the opposite end multi-medium AP are three-address modes or not, and if yes, determining that the data packet to be sent is prohibited from being sent through a wireless fidelity (WiFi) interface of the multi-medium Client.

9. The multi-medium client according to claim 8, wherein the program codes further cause the processor to perform the following steps:
after determining that the data packet to be sent is prohibited from being sent through the WiFi interface of the multi-medium Client, sending the data packet to be sent through interfaces except the WiFi interface on the multi-medium Client.

10. The multi-medium client according to claim 9, further comprising: a wireless local area network media access control (WLAN MAC) entity or an upper layer entity, wherein the program codes further cause the processor to perform the following steps:
querying the current WLAN operating mode of the multi-medium Client from the WLAN MAC entity or the upper layer entity, and notifying the opposite end multi-medium AP of the current WLAN operating mode of the multi-medium Client acquired by querying; or after the current WLAN operating mode of the multi-medium Client is changed, acquiring the current WLAN operating mode of the multi-medium Client according to a notification of the WLAN MAC entity or the upper layer entity, and notifying the opposite end multi-medium AP of the acquired current WLAN operating mode of the multi-medium Client.

* * * * *